March 29, 1966   J. KAPLAN   3,242,696
MULTIPLE SPRING SLIP ELEMENT
Filed Oct. 29, 1963
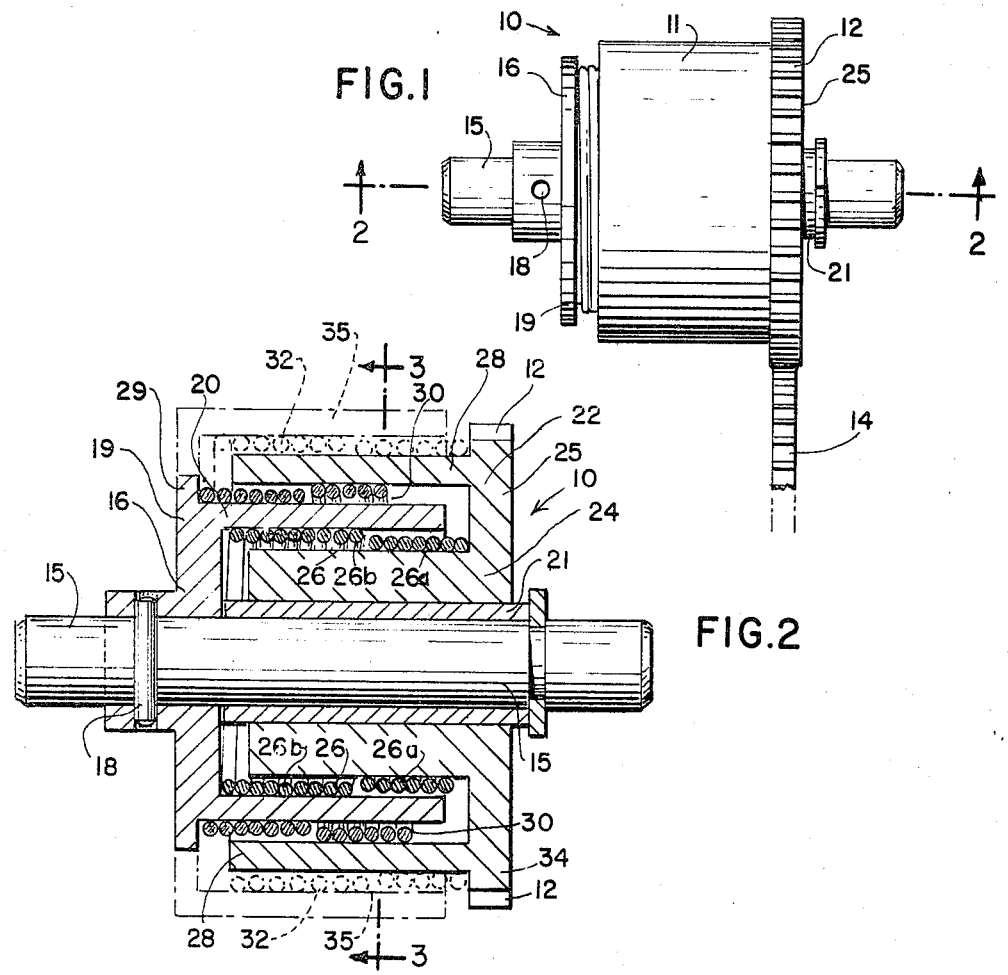
FIG.1
FIG.2
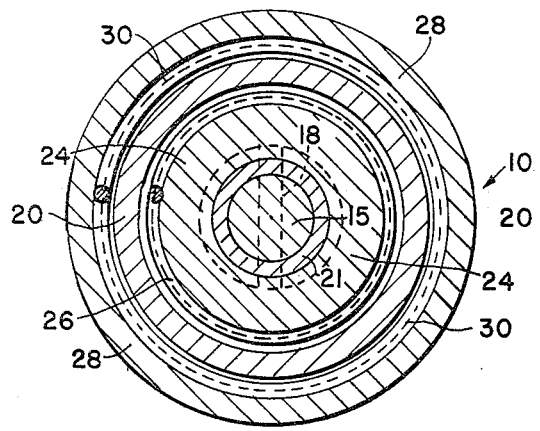
FIG.3
INVENTOR.
JOSEPH KAPLAN
BY
ATTORNEYS United States Patent Office 3,242,696
Patented Mar. 29, 1966

3,242,696
MULTIPLE SPRING SLIP ELEMENT
Joseph Kaplan, 39 Fair Lane, Jericho, Long Island, N.Y.
Filed Oct. 29, 1963, Ser. No. 319,741
3 Claims. (Cl. 64—30)

This invention relates to a slip element; and more particularly it describes a multiple spring slip element such as a brake, clutch, and the like.

Spring wrap type slip elements are known in the art. The primary design characteristics of these slip elements is that the spring couples the input and output parts and also participates actively in the slip action between the input and output parts. The primary operating characteristic of these slip elements is the constancy of the slip torque, which is unaffected by temperature and lubrication conditions. The slip torque at breakaway is the same as at high velocity slip conditions. On the other hand, the commonly used slip elements experience major variations in their limit torque settings.

The spring wrap type slip elements are limited, however, to design applications requiring low torque and low power dissipation. The latter is especially true if the precision and the constancy of torque are required over long periods of operation. The first design innovation which enabled this type of element to increase its power dissipation capability for continuous slip conditions, was the introduction in the art of taper wound and taper ground springs. This innovation provided for a more equal distribution of the power dissipation over the slip area of the element. The present innovation pertains to the use of a multiple number of springs for generating the slip torque. This permits designs of a higher slip torque, increased power dissipation capacity, and longer operating life of a slip element in a given volume.

The construction of a single spring slip element is such that in order to obtain relatively large power dissipation the body or frame of the element itself must be relatively large. With today's emphasis on miniaturization, this may be a serious defect. A slip element must structurally and functionally relate to the other components of a system.

It is a primary object of this invention, therefore, to provide a spring type slip element which will occupy a minimum volume, so that ratio between transmitted power and volume occupied will be optimized.

Another cardinal object of the instant invention is to set forth a slip type spring element of optimum power that will be relatively efficient and yet simple, and that will be more durable and have a longer operating life.

Another important object and accomplishment hereof is the provision of means in a slip type element wherein power may be transmitted to the input and output elements through a plurality of means.

Another principal object and accomplishment hereof is to set forth a novel slip type element of relatively small size wherein the torque or power transmission may be controlled over a relatively wide range of speeds of rotation.

The above objects and accomplishments and others are obtained by the provision of a plurality of concentrically and axially arranged springs between the input and output elements.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a side elevational view of one embodiment of a spring type slip element constructed according to this invention.

FIG. 2 is a sectional view taken substantially along line 2—2 of FIG. 1.

FIG. 3 is a sectional elevational view taken substantially along line 3—3 of FIG. 2.

Referring to FIG. 1, there is illustrated a typical slip element constructed in accordance with this invention. The slip element 10 shown herein will be comprised of an outer casing 11 which may have a toothed flange 12 to drive a driven gear 14. The outer casing 11 and the toothed flange 12 will, therefore, be considered the output of the illustrated slip element 10.

Extending through the center of the slip element 10 axially, will be an input shaft 15. As is usual, the slip element serves to provide a predetermined amount of power dissipation between the input shaft 15 and the output toothed flange 12.

It is to be noted that the slip element shown and described herein at 10 is merely for exemplary purposes. Slip elements of many shapes, sizes and configurations may be fabriacted in accordance with the inventive concept of this invention.

As will be customary, a first spring retaining element 16 is secured to the input shaft 15 as by a pin 18 or the like.

The first spring retaining element 16 consists of a radially extending flange 19 and a sleeve portion 20 spaced from the input shaft 15 and concentrically surrounding the same.

It will be seen in FIGS. 2 and 3 that a bearing collar 21 surrounds the input shaft 15 intimately in such manner as to permit free relative rotation between the said bearing collar 21 and the said input shaft 15. Connected to the bearing collar 21 integrally is a second spring retaining element 22. The said element 22 consists of a second sleeve portion 24 in engagement with the bearing collar 21 and a second radially extending flange 25. The radially extending flange 19 of the first spring retaining element 16 and the second radially extending flange 25 of the second spring retaining element 22 are thus spaced a predetermined parallel distance apart.

A first spring 26 is provided between the sleeve portions 20 and 24 in a concentric manner and extends between the radial flanges 19 and 25.

Thus, it will be seen that the input shaft 15 and the second spring retaining element 22 will be free to relatively rotate except for the retaining bias of the first spring 26. The said first spring 26 may be of special design and construction as will be set forth hereinafter in greater detail.

However, the second flange 25 will radially extend beyond the sleeve portion 20. The said flange 25 further has a third sleeve portion 28 extending outwardly from and concentric with the first sleeve portion 20. Additionally, the flange 19 radially extends beyond the first sleeve portion 20 by at least a minimum amount as shown at 29. A second spring 30 is located between the sleeve portion 20 and the third sleeve portion 28 in a concentric manner and extends from the radial extension 29 to the second radially extending flange 25.

This second spring 30 will further tend to resist relative rotation between the input shaft 15 and the output members.

This, in essence, is the gist of the invention. There is set forth at least two springs between the input and the output members with some of the parts that serve to restrain the first spring, similarly serving to retain the second spring. This provides for a slip element with improved operation that will ocupy a minimum volume.

Although in the illustrated embodiment of the invention the first and second springs are spaced concentrically, it is to be noted that they could equally as well be arranged with an axial displacement. Further, combinations of slip elements could be arranged with both radial and concentric displacements.

As an example, in FIG. 2 there is shown in phantom a third spring 32 concentrically displaced from the first and second springs 26 and 30. As shown therein in phantom, the radial flange 19 will extend beyond the third sleeve portion 28, and will have a fourth radial sleeve 35 extending therefrom about the input shaft 15. The radial flange 25 will extend beyond the third sleeve portion 28 by a minimum amount 34.

The third spring 32 will thus be located concentrically about the input shaft 15 between the third and fourth sleeve portions 28 and 35 between the third and fourth radial flanges 29 and 34. This will further increase the capacity of the clutch while increasing the volume of the said slip element a minimum amount.

It will, of course, be noted that any number of similar springs may thus be added in a similar manner or by an axial displacement of the springs or the like.

Of course, the outermost sleeve in any of the embodiments of the slip element may comprise the said outer casing 11 of the slip element 10.

As was mentioned heretofore, it is contemplated that a special spring design may, if desired, be incorporated in this invention to improve the operation thereof. The spring construction is novel.

As shown in the drawings, each of the springs 26, 30 and/or 32, if utilized, may be a stepped spring. Such a spring may consist of two steps. By way of example, the operation of the illustrated first spring 26 will be described, but it will be realized that the other springs may operate in a similar manner.

The spring 26 may consist of a portion of a smaller diameter 26a and a portion of a larger diameter 26b. The inside diameter of the smaller portion 26a will be such that the said portion 26a will be clasped tightly about the outer diameter of the second sleeve portion 24. The larger diameter portion 26b of the spring 26 will be such as to be compressed within the inner diameter of the first sleeve portion 20.

Rotation of the input shaft 15 relative to the output in one direction will cause the coils of the spring 26a to tend to wind and thus to grip tightly upon the second sleeve 24. The same rotation will cause the large diameter coils 26b to wind and thus contract somewhat and slip within the first sleeve 20. Rotation of the input shaft 15 relative to the output in the opposite direction will reverse the action of the spring parts 26a and 26b and slip will be effected between the smaller coils of the spring 26a and the second sleeve 24.

Such two-diameter springs can provide different slip torques in the two directions of shaft rotation if desired, in addition to the other advantages of the arrangement described herein set forth heretofore.

It will be seen then that there is provided herein a novel slip element arrangement which will be economical in volume and which will afford a higher torque and power dissipation capacity, as well as a longer operation life. The use of multiple springs in a single slip element will further make available the possibility of combinations of different types of springs so as to provide special slip element effects. Additionally, the multiplicity of springs will make unlikely the total failure of the slip element at any time. At worst, only a single spring will fail at a time. Most mechanisms will then provide ample warning of the failure period to the total breakdown of the slip element.

Although there is shown in the illustrated embodiment of this invention a certain type of input and output member, it is to be emphasized that any form of such members may be utilized. Indeed, the entire appearance of the mechanism may be altered and yet remain within the scope of the invention. Commercial embodiments of the inventive concept set forth herein may, if desired, include additional features for repair or alteration of the slip element.

What is important, however, is the provision of a torque transmission device in a compact package including a plurality of springs.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein or required by the prior art.

Having thus described my invention and illustrated it use, what I claim as new and desire to secure by Letters Patent is:

1. A torque limiting slip coupling comprising:
   (a) A first element and a second element rotatable relative to the said first element.
   (b) A plurality of stepped circular springs coupling said first and second elements, the inner diameters of the small diameter steps of each of said springs grasping one of said elements and the outer diameters of the large diameter steps of each of said springs reacting against the inner diameter of the other of said elements; each of said spring steps exerting respectively a controlled limit torque between the elements, the limit torques of the respective steps being additive.

2. A torque limiting slip coupling comprising:
   (a) A first element and a second element rotatable relative to the said first element.
   (b) Each of said elements having a plurality of annular slots.
   (c) A plurality of stepped circular springs coupling said first and second elements, the inner diameters of the small diameter steps of each of said springs grasping one of said elements and the outer diameters of the large diameters steps of each of said springs reacting respectively against sucessive inner diameters of the other of said elements; each of said spring steps exerting respectively a controlled limit torque between the elements, the limit torques of the respective steps being additive.

3. A torque limiting slip coupling comprising:
   (a) A first element and a second element rotatable relative to the said first element.
   (b) A plurality of stepped circular springs coupling said first and second elements, the inner diameter of the small diameter step of one spring grasping one of said elements and the outer diameter of the large diameter step expanding against the inner diameter of said second element; the inner diameter of the small step of the second of said springs grasping the second of said elements and the outer diameter of the large diameter step of the second of said springs expanding against the inner diameter of the first of said elements; each of said spring steps exerting respectively a controlled limit torque between the said elements, the limit torques of the respective steps being additive.

References Cited by the Examiner

UNITED STATES PATENTS

| | | | |
|---|---|---|---|
| 2,751,773 | 6/1956 | Woodson | 192—41 X |
| 2,984,325 | 5/1961 | Tomko et al. | 192—81 |

DAVID J. WILLIAMOWSKY, *Primary Examiner.*

DON A. WAITE, *Examiner.*

A. T. McKEON, *Assistant Examiner.*